United States Patent
Guehring et al.

(10) Patent No.: US 9,552,740 B2
(45) Date of Patent: Jan. 24, 2017

(54) AUTONOMOUS SAFETY SYSTEM FOR THE USERS OF VEHICLE SIMULATORS

(75) Inventors: Olaf Guehring, Eurasburg (DE); Holger Schmidt, Freising (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 683 days.

(21) Appl. No.: 13/989,173

(22) PCT Filed: Dec. 5, 2011

(86) PCT No.: PCT/DE2011/002081
§ 371 (c)(1),
(2), (4) Date: May 23, 2013

(87) PCT Pub. No.: WO2012/076002
PCT Pub. Date: Jun. 14, 2012

(65) Prior Publication Data
US 2013/0252209 A1    Sep. 26, 2013

(30) Foreign Application Priority Data

Dec. 8, 2010 (DE) .................. 10 2010 053 686

(51) Int. Cl.
*G09B 9/05* (2006.01)
*G09B 9/08* (2006.01)

(52) U.S. Cl.
CPC .. *G09B 9/05* (2013.01); *G09B 9/08* (2013.01)

(58) Field of Classification Search
CPC ..................................................... G09B 9/05
USPC ..................................................... 434/34, 69
See application file for complete search history.

(56) References Cited

U.S. PATENT DOCUMENTS

| | | | |
|---|---|---|---|
| 5,021,954 A | 6/1991 | Fox et al. | |
| 5,333,514 A | 8/1994 | Toyama et al. | |
| 5,584,697 A | 12/1996 | Trumbull | |
| 5,715,729 A | 2/1998 | Toyama et al. | |
| 5,752,834 A | 5/1998 | Ling | |
| 5,857,917 A | 1/1999 | Francis et al. | |
| 6,516,681 B1 | 2/2003 | Pierrot et al. | |
| 7,959,513 B2 | 6/2011 | Ochi | |
| 2004/0195457 A1* | 10/2004 | Baker | B64D 25/14 244/137.2 |
| 2005/0091018 A1 | 4/2005 | Craft | |
| 2009/0008186 A1 | 1/2009 | Taylor et al. | |

(Continued)

FOREIGN PATENT DOCUMENTS

| | | |
|---|---|---|
| DE | 689 10 137 T2 | 3/1994 |
| DE | 600 20 466 T2 | 4/2006 |

(Continued)

OTHER PUBLICATIONS

Japanese Office Action for Application No. 2013-542371, Dated Jun. 10, 2014 and English Translation.

(Continued)

*Primary Examiner* — Robert J Utama
*Assistant Examiner* — Elroy S Crocker
(74) *Attorney, Agent, or Firm* — Brinks Gilson & Lione

(57) ABSTRACT

A method and apparatus for the safe use of a vehicle simulator is provided. The apparatus having an access zone, a rescue unit, a shock absorbing surface, and a projection surface. The rescue unit being moveable with the vehicle simulator.

12 Claims, 6 Drawing Sheets

(56) References Cited

U.S. PATENT DOCUMENTS

| | | | | |
|---|---|---|---|---|
| 2010/0279255 A1* | 11/2010 | Williams, II | ............ | G09B 9/14 434/29 |
| 2011/0039235 A1* | 2/2011 | Margreiter | ............... | G09B 9/08 434/35 |
| 2013/0252209 A1 | 9/2013 | Guehring et al. | | |

FOREIGN PATENT DOCUMENTS

| | | |
|---|---|---|
| DE | 10 2008 023 955 B4 | 11/2009 |
| EP | 0 324 567 A2 | 7/1989 |
| JP | 61-068074 | 10/1987 |
| JP | 04-027950 | 2/1992 |
| JP | 03-238278 | 3/1993 |
| JP | 2001-060772 | 3/2001 |
| JP | 2001-091634 | 4/2001 |
| JP | 2002-123166 | 4/2002 |
| JP | 2004503308 | 2/2004 |
| JP | 2004-252618 | 9/2004 |
| JP | 2006-087937 | 4/2006 |
| JP | 2006-323167 | 11/2006 |
| JP | 2008-067741 | 3/2008 |
| JP | 2010-134525 | 6/2010 |
| WO | WO 2012/076002 A1 | 6/2012 |

OTHER PUBLICATIONS

German Office Action dated Jun. 15, 2011, Serial No. 10 2010 053 686.5 and English Translation.

International Search Report Dated Apr. 25, 2012, Serial No. PCT/DE2011/002081.

Canadian Office Action, Serial No. 2,815,884, Dated Jun. 30, 2016.

\* cited by examiner ially of a
AUTONOMOUS SAFETY SYSTEM FOR THE USERS OF VEHICLE SIMULATORS

CROSS REFERENCE TO RELATED APPLICATIONS

This application is a national stage application under 35 U.S.C. 371 of international application number PCT/DE2011/002081 filed Dec. 5, 2011 (WO 2012/076002) and also claims priority to German application number 10 2010 053 686.5 filed Dec. 8, 2010, all of which are hereby incorporated by reference in their entirety.

SUMMARY

The invention relates to an apparatus and to a method for operating a safety system for the users of vehicle simulators.

In order to shorten the learning process involved in learning to use different vehicles and, in practice, to minimize risks both in the initial phase of such a process and in relation to training, increasing use is being made in recent times of appropriate simulators.

For this purpose, DE 10 2008 023 955 B4 describes a method for simulating events and processes associated with aircraft, land-based vehicles or watercraft and a corresponding simulation system, for example. It is the underlying object of this invention to activate a simulation device in real time even though the data required for activation are supplied only by a simulation program which is not real-time, with the intention being that a latency caused by a data manager should be compensated.

Here, the term "real time" is taken to mean the time actually required by processes in the real world. The term "real time" does not refer to a particular speed or processing power of the program or of the controller but merely defines the timeframe within which the system must respond. The term "latency" refers to a period of time between an action and the occurrence of the reaction that is to be expected, i.e. a delay.

The essential feature protected in this patent is that, if data do not arrive on time, the data gap which arises is filled by data from empirical values or by data from previous simulation programs, and these data are then sent to the motion controller of the real-time simulation device. No indications on the operation of a safety system for the user of a vehicle simulator can be found here.

DE 600 20 466 T2 furthermore discloses a "parallel robot" with four degrees of freedom which achieves the object of moving a mobile plate with four degrees of freedom at high speed and with a high acceleration and of positioning the mobile plate with a high rigidity and accuracy. Here, the term "parallel robot" is used to refer to a robot in which a multiplicity of actuators is arranged in parallel, it being possible to use a robot of this kind in a driving simulator for a motor vehicle, for example.

In this publication, parallel robots with six degrees of freedom are mentioned in connection with the prior art, these being used in flight simulators of the kind disclosed in U.S. Pat. Nos. 5,333,514 and 5,715,729, for example.

To achieve the object stated in DE 600 20 466 T2, a parallel robot is described which consists essentially of a special arrangement of a parallel linkage (3), a moving platform (4), coupling components (42) and kinematic elements (33). This publication does not deal with safety systems for the users of vehicle simulators.

It is therefore the underlying object of the apparatus according to the invention and of the corresponding method to propose an apparatus and a method where the primary concern is not only obtaining operational knowledge of vehicles but also the safety of the user of a vehicle simulator in the event of a technical fault or an accident.

The object is achieved by an apparatus as claimed in claim 1 and by a method as claimed in claim 7.

The apparatus according to the invention is described in greater detail below. More particularly:

DETAILED DESCRIPTION

Figure 1:
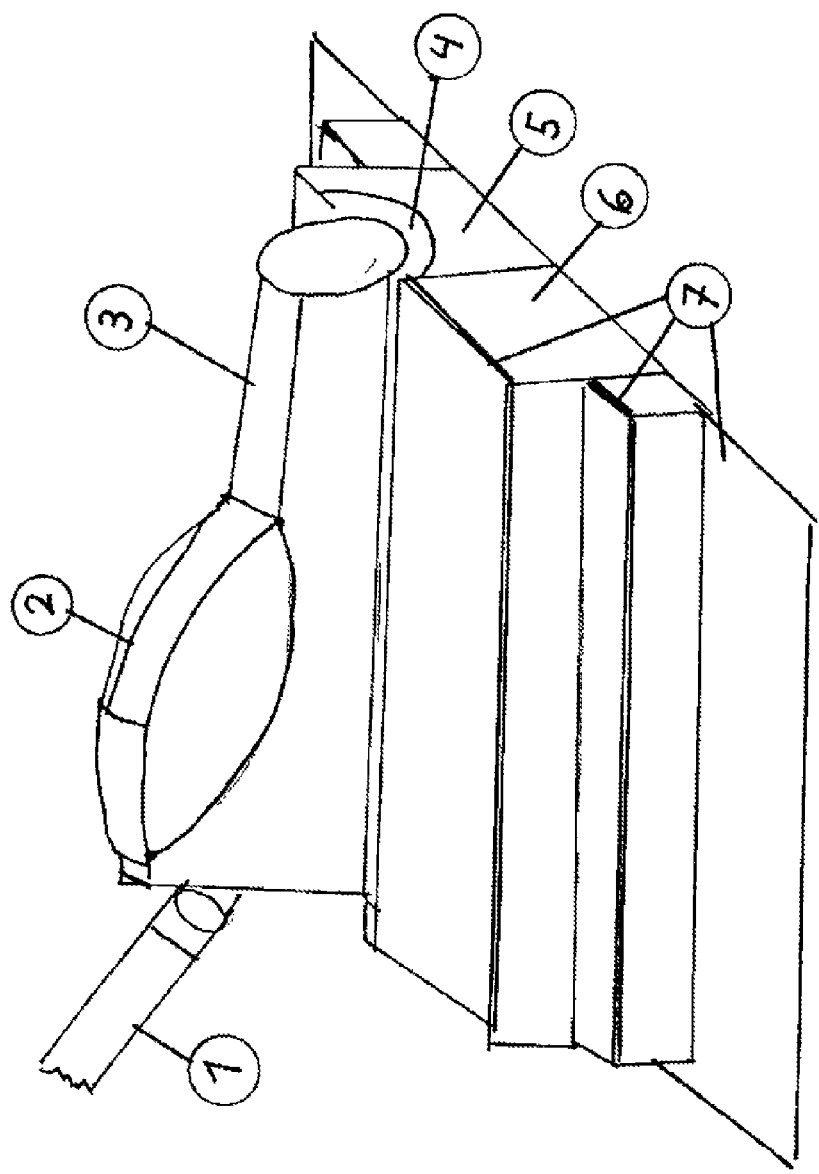
FIG. 1: shows a perspective view of a vehicle simulator.

FIG. 1 shows a perspective view of a vehicle simulator in the idle position thereof. A vehicle cockpit 3 having a cockpit upper part 2 that can be opened for boarding is moved in the desired manner in 3 dimensions by means of a flange-mounted robot arm 1 in accordance with the instructions of a vehicle trainee and the defined responses of a simulation program. In the idle position, the cockpit 3 is supported on a damping layer 4 as the top part of the boarding apparatus 5, said layer being shaped to match the contour of the underside of the cockpit. Respective boarding stairs 6, made wider on the topmost step for convenient boarding, lead up to the height of the boarding zone of the cockpit 3 on both sides. All the treads shown are provided on both sides with a sensor layer 7, which indicates access to the vehicle simulator to the controller of the overall system as soon as someone steps onto the boarding apparatus 5.

In one particular embodiment, special sensors (not shown specially here) are provided in one or more of the treads to measure the weight or mass of the respective persons climbing onto the vehicle simulator. In this way, the controller of the overall system obtains additional information for the purpose of estimating the force that has to be applied by the robot to accelerate and move the cockpit 3. This increases the operational safety of the vehicle simulator since it is possible to make a realistic estimate of the load peaks induced by the simulation program and imposed on the person and the machine.

It is furthermore important for the control program to be informed by means of a plurality of sensors on each seat and at each seat belt in the cockpit 3 whether the seat is occupied and the user concerned is also belted up. The boarding process and correct closure of the cockpit must also be monitored by sensors.

Figure 2:
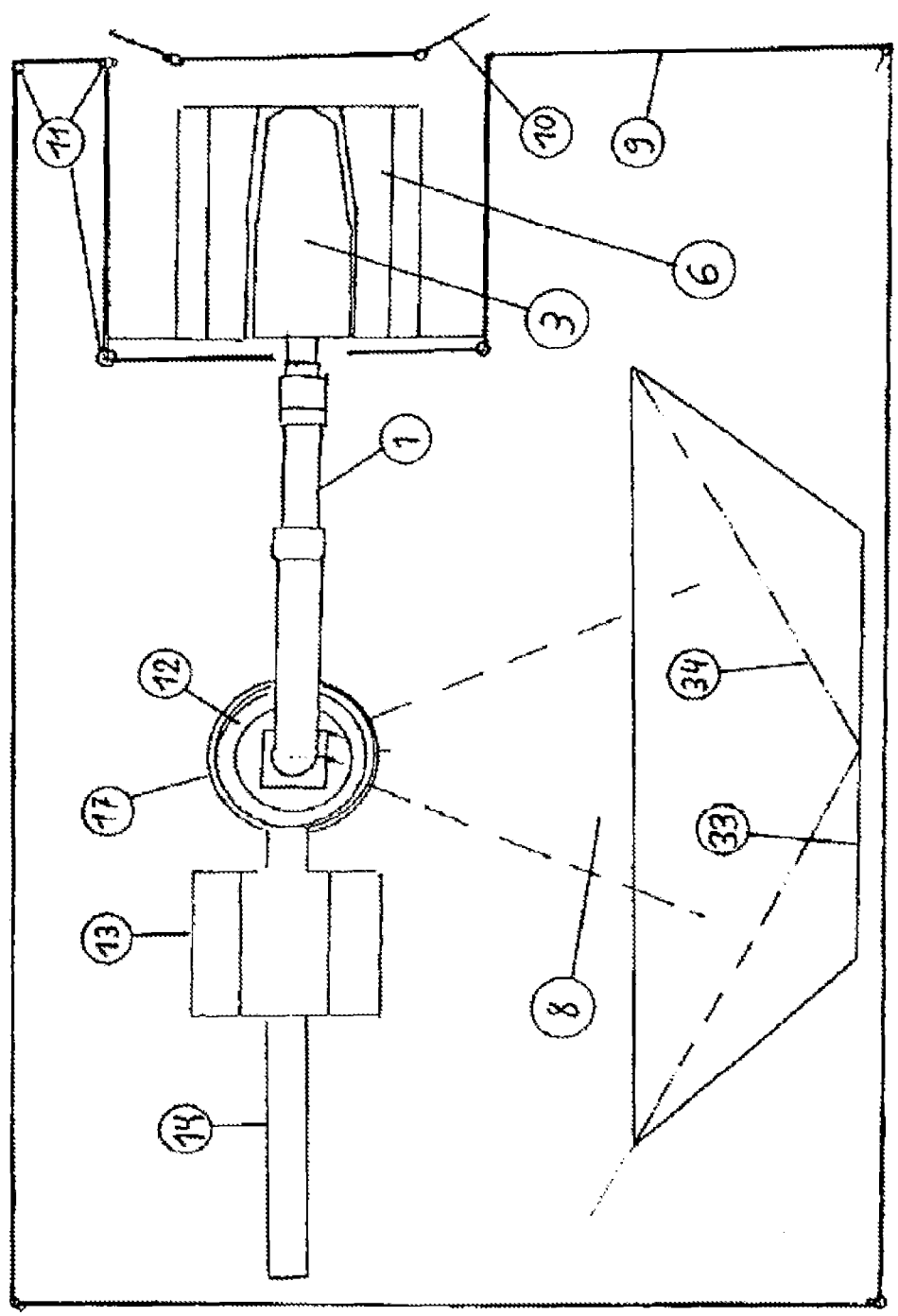
FIG. 2: shows a plan view of an apparatus according to the invention.

FIG. 2 shows a plan view of an apparatus according to the invention.

The working zone of the vehicle simulator is indicated in the form of the angular range 8 depicted in dashed lines. In the plan view, it is possible to see here the robot arm 1 and the connection thereof to the vehicle cockpit 3 in the region of the boarding stair 6. In FIG. 2, the pedestal of the robot used is denoted by 12.

The slewing ring 17 can be seen concentrically around the pedestal 12, together with the running rail 14 of the rescue unit 13 in the position forming the extension of the robot arm 1. A side view relating to the use of the rescue unit 13 can be found in FIG. 4.

The safety perimeter 9, which is interrupted only by two entry doors 10, is shown around the entire access zone and working zone in this figure. Monitoring sensors 11 are installed at all the corners of the safety perimeter 9. These monitoring sensors 11 can be designed as optical sensors which, in interaction with respective light-emitting units, have the function of a light barrier for each section to be monitored. Here, the range of the light wavelength used can extend from visible light to infrared light.

In the lower area of FIG. 2, a projection surface A denoted by 33 and a projection surface B denoted by 34 are shown in cross section from above by way of example. Here, projection surface 34 represents the simplest case of a projection wall with a single bend. Projection surface 33 is embodied as a projection wall with two bends. In both cases, the top surface, which likewise serves as a projection surface, cannot be seen in such a representation. Basic remarks relating to the projection method used can be found at the end of the description.

Figure 3:
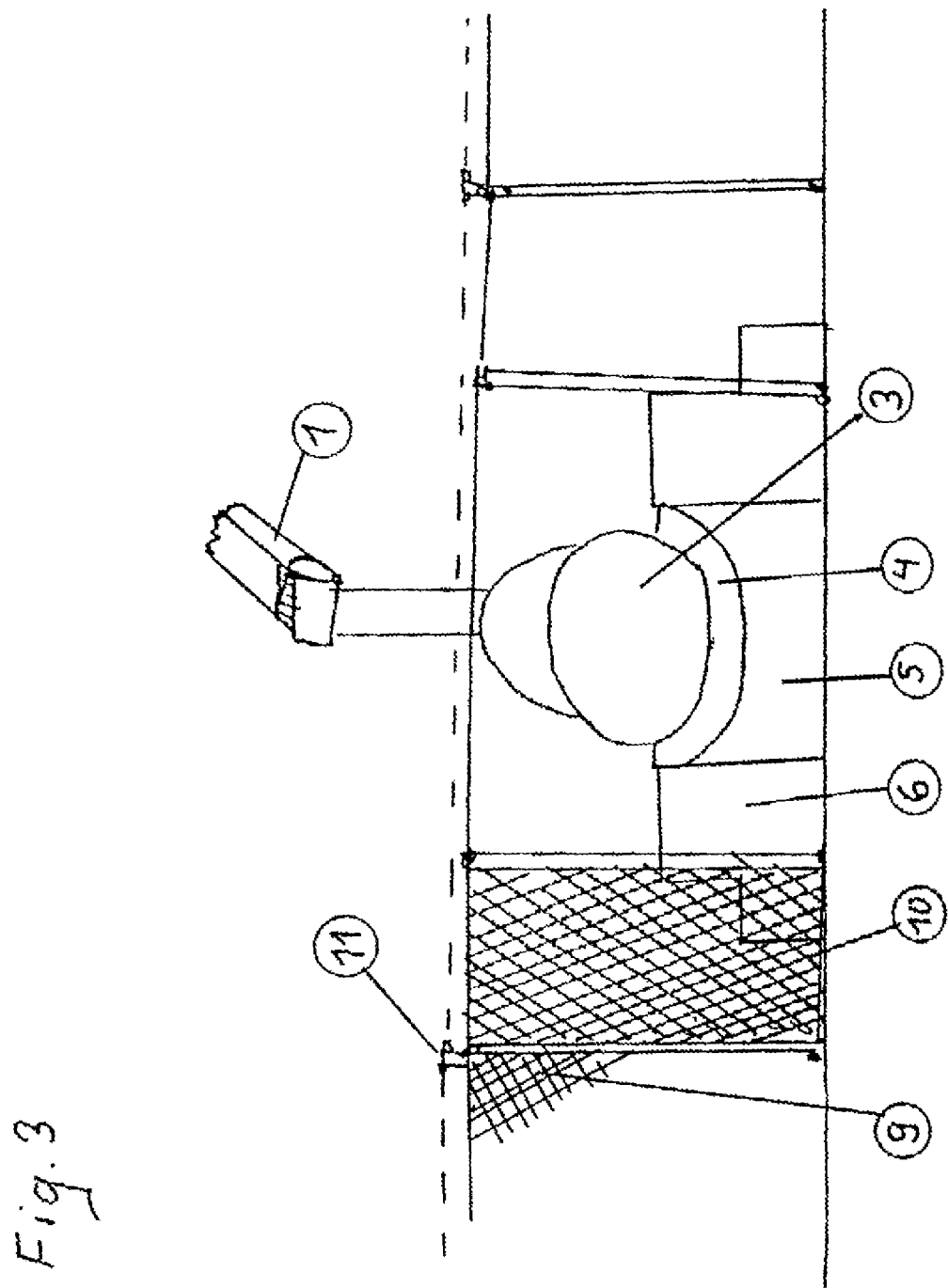
FIG. 3: shows a front view of a safety system according to the invention.

FIG. 3 shows the front view of a safety system according to the invention.

In addition to the sketched robot arm 1, the vehicle cockpit 3, the damping layer 4, the boarding apparatus 5 and the boarding stair 6, shown in front view, the left-hand entry door 10 and part of the safety perimeter 9 are specially indicated in this view. Moreover one of the monitoring sensors 11 mounted at each corner is specially indicated.

Figure 4:
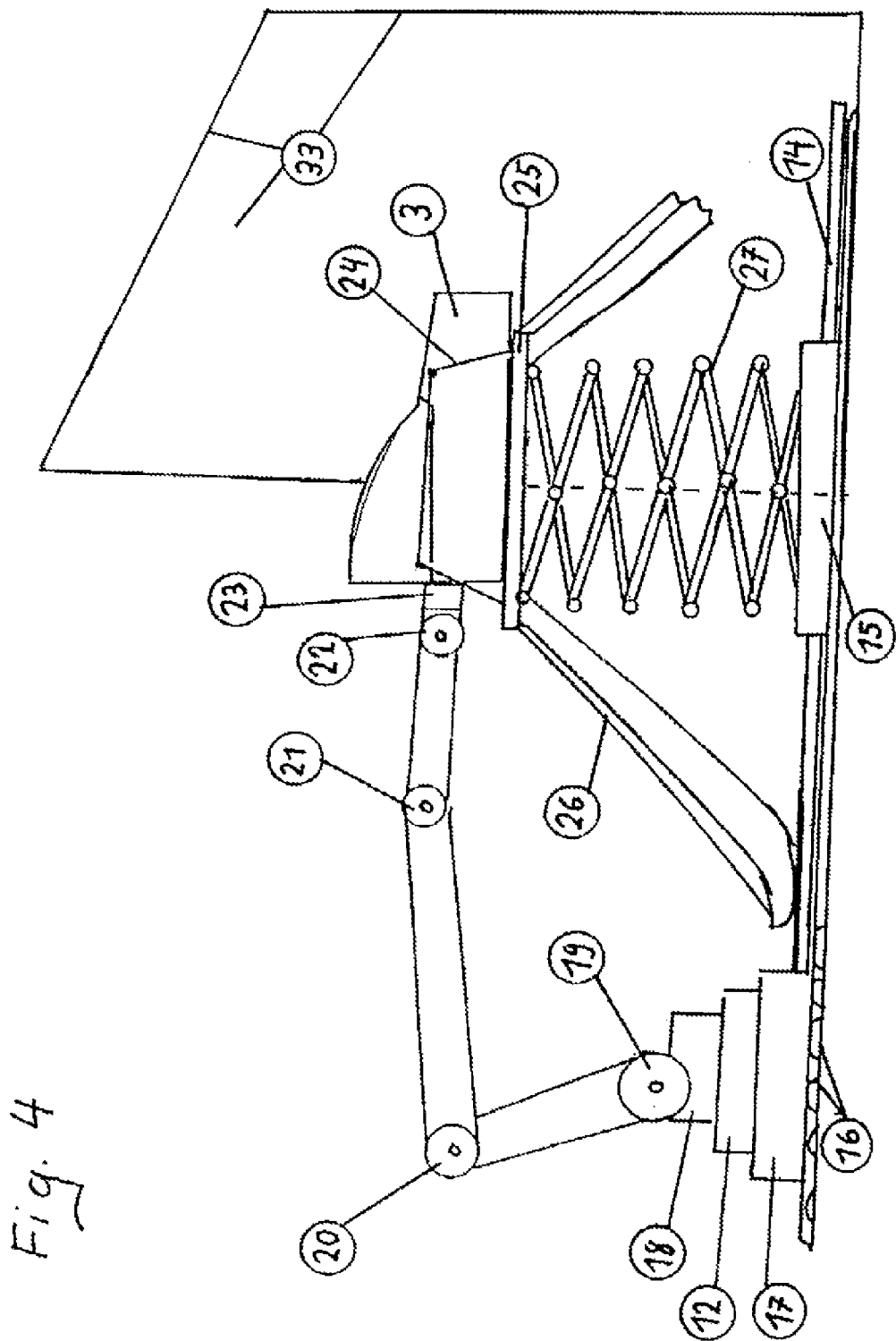
FIG. 4: shows a side view of a safety system according to the invention.

FIG. 4 shows a side view of a safety system according to the invention.

In addition to the pedestal 12 of the robot and the slewing ring 18 of the robot arm 1, a first revolute joint denoted by 19, a second revolute joint denoted by 20, a third revolute joint denoted by 21, a fourth revolute joint denoted by 22 and a fifth revolute joint denoted by 23 and the direct attachment of the cockpit 3 thereby can be seen here in sequence. The slewing ring 17 of the rescue unit 13, which was shown from above in FIG. 2, is furthermore installed concentrically with the slewing ring 18 of the robot arm.

The rescue unit 13 is based on a carriage 15, which can be moved to the location of use thereof along a running rail 14. The drive required for this purpose is omitted here for reasons of clarity. The same applies to the slewing ring 17 of the rescue unit 17. The rescue unit 17 furthermore consists of a lifting unit 27 for lifting a rescue platform 25, which is secured all the way around by a railing 24. Descent from the rescue platform 25 can be accomplished by lowering the lifting unit 27 or, in urgent cases, by means of the rescue slides 26. In this FIG. 4, the formation of zones with a function denoted as "airbag equipment" can be seen in the floor, denoted by 16. This is illustrated in greater detail in FIG. 5.

In the right-hand area of FIG. 4, the projection surface 33 is shown from the side. Basic remarks relating to the projection method used can be found at the end of the description.

Figure 5:
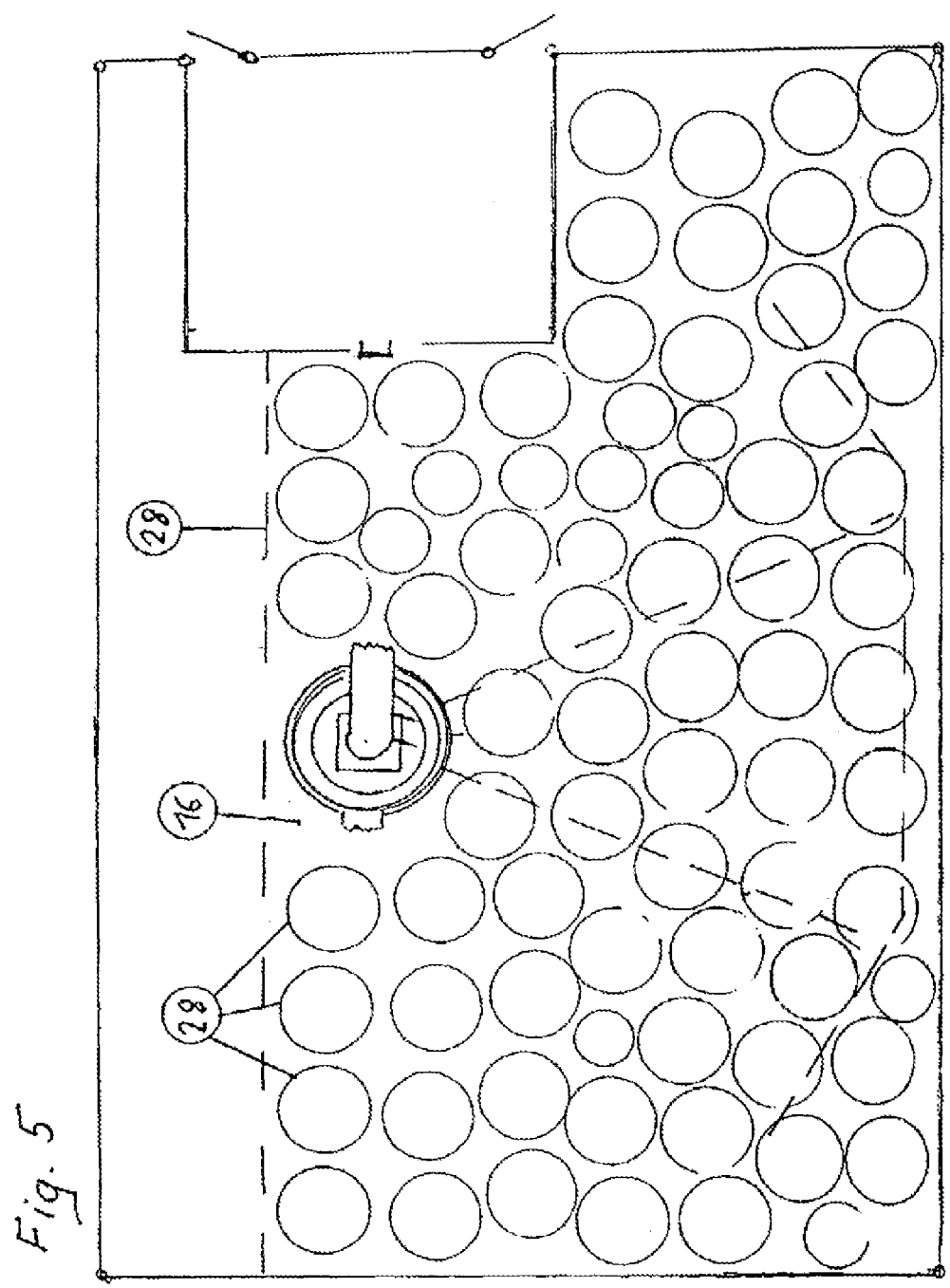
FIG. 5: shows a plan view of the floor structure of a safety system according to the invention.

FIG. 5 shows a plan view of the floor structure 16 of a safety system according to the invention. The circular areas shown there represent particular safety zones 28, for example, within which an airbag can inflate from each of said areas when there is a risk of impact by a person or a machine in order to damp a corresponding impact from above, as in the case of the airbag in a car. A sensor (not shown) which is assigned to each of the round partial areas required and which detects a rapid approach by falling masses is used in each case as a trigger for such events. The required covering depends on the area of the airbag in the inflated stage and the operating zone of the robot arm 1 that is to be expected and/or is technically possible in interaction with the cockpit 3.

Figure 6:
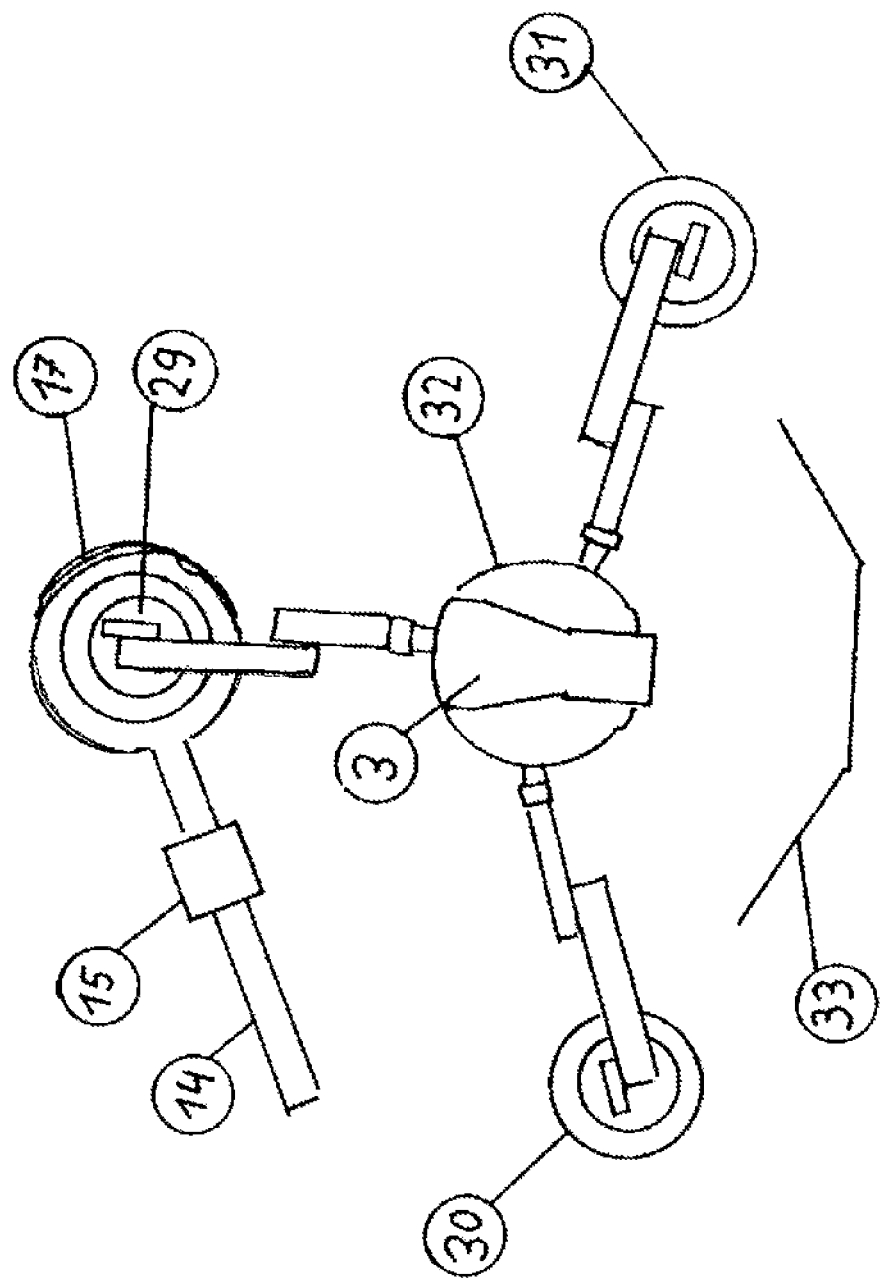
FIG. 6: shows a special design for a heavy vehicle cockpit.

FIG. 6 shows a special design according to the invention for a heavy vehicle cockpit 3. In this design, the robot arm 1 is replaced by the robot arms of a total of three robots. In this way, the load of the vehicle cockpit is distributed between the three robots 29, 30 and 31, which jointly support the vehicle cockpit 3 via the platform 32. Here, the slewing ring 17 of the rescue unit 13 with a running rail 14 of appropriate length and the carriage 15 is assigned to robot 29. Instead of interaction between three robots, interconnection of two robots may also be sufficient in some cases.

Acoustic detection and evaluation of characteristic machine noises can be used as a special embodiment of the means of ensuring protection from damage to machine components that could lead to the unforeseeable failure of a robot and hence to a risky situation for users of the vehicle simulator according to the invention. The spectrum of normal noises that occur during the operation of industrial robots is recorded by acoustic sensors and used as a reference. Both airborne noise signals and structure-borne noise signals are suitable here. If noises outside the bandwidth of the normal frequency and/or of the noise level occur during the operation of such a robot, this is detected by an electronic analysis circuit and reported to the controller for the entire system. Depending on the extent of the deviation detected in this way, it may be necessary to switch off the entire system at the next acceptable time or to perform appropriate additional checks during the next service.

As another embodiment, provision can be made, in the case of drives using belt-like transmission elements, where premature failure can be detected acoustically only with very great difficulty, to employ optical sensors. With such sensors, it is possible to detect and record unusual flapping or impermissible vibration of components. If unusual measured values occur, the same measures must be taken as in the case of acoustically detected faults.

Damage to electrical components of a vehicle simulator can also lead to unwanted and, in particular, unforeseeable failures of the entire system. Since such damage is often revealed by the formation of smoke, sensors for detecting noticeable smoke formation are provided as a special embodiment in the relevant parts of the system. Moreover, emergency generating sets and/or buffer batteries are provided to counter failure of the electric power supply.

A typical operating sequence is shown below in 19 steps:

Method steps for the operation of the simulator according to the invention while taking account of safety lights for users 1. Standby
   sensors, working zone (on)
   sensors, boarding zone (on)
   sensors, entry gates (on)
   sensors, canopy (on)
   sensors, seat (on)
   light (red)
2. Personal ID
   sensors, working zone (on)
   sensors, boarding zone (on)
   sensors, entry gates (on)
   sensors, canopy (on)
   sensors, seat (on)
   light (red)

3. Parking, ready for operation
sensors, entry gates (off)
sensors, boarding zone (off)
sensors, working zone (on)
sensors, canopy (on)
sensors, seat (on)
light (green)
4. Boarding access, gate unlocking, gate closure
sensors, entry gates (off)
sensors, boarding zone (off)
sensors, working zone (on)
sensors, canopy (on)
sensors, seat (on)
light (green)
5. Open canopy, boarding
sensors, entry gates (on)
sensors, boarding zone (off)
sensors, working zone (on)
sensors, canopy (off)
sensors, seats (off)
light (green)
6. Put on belts
sensors, entry gates (on)
sensors, boarding zone (on)
sensors, working zone (on)
sensors, canopy (off)
sensors, seats (on)
light (green)
7. Close canopy
sensors, entry gates (on)
sensors, boarding zone (on)
sensors, working zone (on)
sensors, canopy (on)
sensors, seats (on)
light (red)
8. Working position, adjustment
sensors, entry gates (on)
sensors, boarding zone (on)
sensors, working zone, perimeter fence, (on)
sensors, canopy (on)
sensors, seats (on)
light (red)
9. Start simulation
sensors, entry gates (on)
sensors, boarding zone (on)
sensors, working zone, perimeter fence, (on)
sensors, canopy (on)
sensors, seats (on)
light (red)
10. End simulation
sensors, entry gates (on)
sensors, boarding zone (on)
sensors, working zone, perimeter fence, (on)
sensors, canopy (on)
sensors, seats (on)
light (red)
11. Return to parking position
sensors, entry gates (on)
sensors, boarding zone (on)
sensors, working zone, perimeter fence, (on)
sensors, canopy (on)
sensors, seats (on)
light (red)
12. Parking position
sensors, entry gates (on)
sensors, boarding zone (on)
sensors, working zone, perimeter fence, (on)
sensors, canopy (on)
sensors, seats (on)
light (red)
13. Unlock canopy, open
sensors, entry gates (on)
sensors, boarding zone (on)
sensors, working zone, perimeter fence, (on)
sensors, canopy (off)
sensors, seats (off)
light (red)
14. Undo belts, get out
sensors, entry gates (on)
sensors, boarding zone (on)
sensors, working zone, perimeter fence, (on)
sensors, canopy (off)
sensors, seats (off)
light (red)
15. Close canopy
sensors, entry gates (off)
sensors, boarding zone (off)
sensors, working zone, perimeter fence, (on)
sensors, canopy (on)
sensors, seats (off)
light (green)
16. Exit via boarding zone, open gate, close door,
sensors, entry gates (off)
sensors, boarding zone (off)
sensors, working zone, perimeter fence, (on)
sensors, canopy (on)
sensors, seats (on)
light (green)
17. Leave boarding zone, close gate
sensors, entry gates (on)
sensors, boarding zone (on)
sensors, working zone, perimeter fence, (on)
sensors, canopy (on)
sensors, seats (on)
light (red)
18. Standby
sensors, entry gates (on)
sensors, boarding zone (on)
sensors, working zone, perimeter fence, (on)
sensors, canopy (on)
sensors, seats (on)
light (red)
19. Switch off, charge batteries of emergency systems
sensors, entry gates (on)
sensors, boarding zone (on)
sensors, working zone, perimeter fence, (on)
sensors, canopy (on)
sensors, seats (on)
light (red)

One significant component of a vehicle simulator is the projection surface which simulates for the user the reality to which he must match his motor responses. Conventional projection methods often use curved projection surfaces which not only require complex controllers for the respective partial areas and expensive projectors but are also dependent on a heavy and expensive holding apparatus for such a curved overall surface. A large-area holding structure of this kind itself already represents a risk since the necessary stability is often skimped here. The autonomous safety system according to the invention therefore uses a projection surface which consists of flat but flexurally rigid, lightweight projection surfaces. In the simplest case, these can be two vertical projection surfaces abutting at a suitable angle which are covered by another surface, as it were as a "lid", to simulate the sky. The abutting edges, formed in this case, of the adjoining surface components are precisely defined and can therefore be managed relatively easily in terms of programming. Moreover, the illumination points representing these abutting edges are very small and the corresponding transition zones therefore do not appear in the overall image. The relatively light holding apparatus for a projection surface configured in this way represents an additional safety aspect.

Control of the complex motion processes and signal processing of the sensors used require a special control program.

As a person skilled in the art will readily appreciate, the above description is meant as an illustration of implementation of the principles this application. This description is not intended to limit the scope of this application in that the invention is susceptible to modification, variation and change, without departing from the spirit of this application, as defined in the following claims.

LIST OF REFERENCE NUMBERS 1 6-Axis robot
2 Entry
3 Adaptor plate
4 Vehicle cockpit, aircraft cockpit
5 Device for translatory longitudinal movement
6 Device for translatory lateral movement
7 Projection surface of the ceiling portion
8 Projection surface of the right-hand side portion
9 Projection surface of the front portion
10 Measuring device for measuring the resistance of the skin
11 Smoke distribution
12 Smoke producer
13 Module system for changing over the operator control panel
14 System for illuminating the cabin
15 OLED display
16 Detector device for detecting movement of persons and/or for detecting the physiognomy
17 Sensor for detecting the cockpit movement

The invention claimed is:

1. An apparatus for the safe use of a vehicle simulator in the form of a simulation cockpit actuated by a 6-axis robot, in particular of a flight simulator, comprising:
   a) an access zone, which is open to those authorized and has at least one sensor to monitor access,
   b) a rescue unit, the rescue unit being moveable on a running rail to each location of the operating zone of the vehicle simulator, wherein this rescue unit has a rescue platform, a railing and a rescue slide,
   c) a shock-absorbing surface installed throughout the operating zone, wherein said surface extends over the operating zone of the cockpit, and
   d) a projection surface to display video.

2. The apparatus as claimed in claim 1, further comprising at least two 6-axis robots, wherein the cockpit is secured on a platform which is, in turn, actuated by the at least two 6-axis robots.

3. The apparatus as claimed in claim 2, wherein the access zone is formed by at least one access door safeguarded by at least one monitoring sensor, and in that at least one access door leads to a boarding stair, the at least one access door is monitored by a sensor layer in respect of entry or of the weight of the person entering.

4. The apparatus as claimed in claim 3, wherein a shock absorbing surface installed in the safety zone comprises a plurality of airbag devices.

5. The apparatus as claimed in claim 3, wherein failures in robot components of the 6-axis robot are detected by an acoustic or optical device, and failures in electrical systems of the apparatus are detected by a smoke detecting device.

6. The apparatus as claimed in claim 1, further comprising an alarm that is triggered in response to predetermined fault indications or foreign-body indications.

7. A method for the safe use of a vehicle simulator in the form of a simulation cockpit actuated by means of a 6-axis robot, in particular of a flight simulator, comprising:
   a) an access procedure which safeguards the access zone,
   b) provision of a rescue unit which can be moved to any location of the vehicle simulator,
   c) the provision of a shock-absorbing surface installed throughout the operating zone, wherein said surface extends over the operating zone of the cockpit, and
   d) the provision of a projection surface to display video.

8. The method as claimed in claim 7, further comprising at least two 6-axis robots, wherein the cockpit is actuated by the at least two 6-axis robots.

9. The method as claimed in claim 7, wherein a shock absorbing surface installed in the safety zone comprises the covering of a multiplicity of airbag devices.

10. The method as claimed in claim 9, wherein failures in robot components of the 6-axis robot are detected by an acoustic or optical device, and failures in the electrical systems of the flight simulator are detected by a smoke detecting device.

11. The method as claimed in claim 10, wherein an alarm is triggered in the event of predetermined fault indications or foreign-body indications.

12. A non-transitory machine-readable medium having the program code of a computer program configured to control a simulation cockpit actuated by a 6-axis robot comprising:
   a) an access procedure which safeguards the access zone,
   b) provision of a rescue unit which can be moved to any location of the vehicle simulator,
   c) the provision of a shock-absorbing surface installed throughout the operating zone, wherein said surface extends over the operating zone of the cockpit, and
   d) the provision of a projection surface to display video.

* * * * *